United States Patent
Tang et al.

(10) Patent No.: US 11,096,131 B2
(45) Date of Patent: Aug. 17, 2021

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventors: Hai Tang, Guangdong (CN); Zhi Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 308 days.

(21) Appl. No.: 16/366,815

(22) Filed: Mar. 27, 2019

(65) Prior Publication Data

US 2019/0223124 A1 Jul. 18, 2019

Related U.S. Application Data

(63) Continuation of application No. PCT/CN2017/109010, filed on Nov. 1, 2017.

(30) Foreign Application Priority Data

Oct. 27, 2017 (WO) ............... PCT/CN2017/108121

(51) Int. Cl.
*H04W 56/00* (2009.01)
*H04W 72/04* (2009.01)
(Continued)

(52) U.S. Cl.
CPC ..... *H04W 56/001* (2013.01); *H04W 72/0453* (2013.01); *H04W 74/0833* (2013.01); *H04W 74/006* (2013.01)

(58) Field of Classification Search
CPC ................................................. H04W 56/001
See application file for complete search history.

(56) References Cited

U.S. PATENT DOCUMENTS

2015/0181624 A1 6/2015 Hwang et al.
2015/0264588 A1 9/2015 Li et al.
(Continued)

FOREIGN PATENT DOCUMENTS

CN 101465688 A 6/2009
CN 102014477 A 4/2011
(Continued)

OTHER PUBLICATIONS (3GPP TSG RAN WG1 Meeting 90bis ; R1-1717740; Prague, CZ, Oct. 9-13, 2017;Agenda Item:7.1.1; Source: Spreadtrum Communications; Title: Cell searching with multiple SS blocks in wideband CC (Year: 2017).*

(Continued)

*Primary Examiner* — Kodzovi Acolatse
*Assistant Examiner* — Abdeltif Ajid
(74) *Attorney, Agent, or Firm* — Ladas & Parry, LLP

(57) ABSTRACT

Embodiments of the present application provide a wireless communication method and a device, which can implement configuration of a random access resource or a random access preamble in an NR system. The method includes: transmitting, by a network device, at least one synchronization signal block to a terminal device on each of at least one frequency point, respectively; transmitting, by the network device, first system information to the terminal device, wherein the first system information indicates a physical random access channel (PRACH) resource or a set of random access preambles corresponding to the at least one synchronization signal block transmitted on each frequency point, for random access of the terminal device.

12 Claims, 8 Drawing Sheets

(51) Int. Cl.
*H04W 74/08* (2009.01)
*H04W 74/00* (2009.01)

(56) References Cited

U.S. PATENT DOCUMENTS

| | | | |
|---|---|---|---|
| 2017/0111931 | A1 | 4/2017 | Damnjanovic et al. |
| 2019/0069256 | A1* | 2/2019 | Jung ................. H04W 72/0453 |
| 2020/0146041 | A1* | 5/2020 | Kim ..................... H04J 11/0076 |
| 2020/0228275 | A1* | 7/2020 | Li ....................... H04W 56/0025 |
| 2020/0229236 | A1* | 7/2020 | Ohara ............... H04W 72/0446 |
| 2020/0288417 | A1* | 9/2020 | Harada ............... H04W 72/044 |
| 2020/0413359 | A1* | 12/2020 | Li ....................... H04W 74/0808 |

FOREIGN PATENT DOCUMENTS

| | | | | |
|---|---|---|---|---|
| CN | | 102111882 A | 6/2011 | |
| CN | | 102625387 A | 8/2012 | |
| CN | | 103945471 A | 7/2014 | |
| CN | | 104812082 A | 7/2015 | |
| CN | | 106376050 A | 2/2017 | |
| CN | | 106804043 A | 6/2017 | |
| WO | | 2017058283 A1 | 4/2017 | |
| WO | WO-2017160222 A1 * | | 9/2017 | ........... H04L 5/0048 |

OTHER PUBLICATIONS

ZTE "WF on random access association configuration" R1-1711799, 3GPP TSG RAN WG1 NR Ad-Hoc#2, Qingdao,China, Jun. 27-30, 2017 2017(Jun. 29, 2017).

International Search Report and Written Opinion for PCT/CN2017/108121 dated Dec. 28, 2017 and English translation provided by Google Translate.
International Search Report and Written Opinion for PCT/CN2017/109010 dated Jul. 18, 2018 and English translation provided by Google Translate.
The Notice of Allowance of corresponding Chinese application No. 201780053238.2, dated Mar. 23, 2020.
Corresponding extended European search report dated Aug. 19, 2019 from EP application No. 17922071.0.
"Remaining details on PRACH procedure" 3GPP Draft; R1-171830; vol. RAN WG1 No. Prague, Czech Republic; Oct. 9, 2017-Oct. 13, 2017; Oct. 8, 2017 (Oct. 8, 2017).
"Remaining details on remaining minimum system information delivery"; R1-1707578—RMSI Deliver V1 3rd Generation Partnership Project (3GPP); vol. RAN WG1, No. Prague, Czech Republic; Oct. 9, 2017-Oct. 13, 2017; Oct. 2, 2017 (Oct. 2, 2017).
"Remaining details on remaining minimum system information"; R1-1715757 Remaining details on RMSI—Final, 3rd Generation Partnership Project (3GPP); vol. RAN WG1, No. Nagoya, Japan; Sep. 18, 2017-Sep. 21, 2017; Sep. 17, 2017 (Sep. 17, 2017).
"Discussion on remaining details on RMSI delivery"; R1-1718181 Discussion on Remaining Details on RMSI Delivery—Final, 3rd Generation Partnership Project (3GPP); vol. RAN WG1, No. Prague, CZ; Oct. 9, 2017-Oct. 13, 2017; Oct. 8, 2017 (Oct. 8, 2017).
"Remaining details on RMSI"; R1-1717799 Remaining Details on RMSI—Final 1.0, 3rd Generation Partnershio Project (3GPP); vol. RAN WG1, No. Prague, CZ; Oct. 9, 2017-Oct. 13, 2017; Oct. 8, 2017 (Oct. 8, 2017).
The first OA of the parallel CN application dated Dec. 2, 2019.
Samsung: "Remaining details on remaining minimum system information delivery", 3GPP TSG RAN WG1; R1-1717578; Oct. 13, 2017.

\* cited by examiner

WIRELESS COMMUNICATION METHOD AND DEVICE

CROSS-REFERENCE TO RELATED APPLICATIONS

This application is a continuation application of PCT Patent Application No. PCT/CN2017/109010, filed on Nov. 1, 2017, entitled "WIRELESS COMMUNICATION METHOD AND DEVICE", which claims priority to PCT Patent Application No. PCT/CN2017/108121, filed on Oct. 27, 2017 and entitled "WIRELESS COMMUNICATION METHOD AND DEVICE", the entire disclosures of both applications are incorporated herein by reference.

TECHNICAL FIELD

The present application relates to the field of communication, and more particularly, to a wireless communication method and a device.

BACKGROUND

In a long term evolution (LTE) system, a terminal device can perform random access according to a preset random access resource and a random access preamble.

In a new radio (NR) system, how to configure the random access resource and the preamble so as to achieve the random access is an urgent problem to be solved.

SUMMARY

A wireless communication method and a device according to embodiments of the present application can implement configuration of a random access resource or a random access preamble in an NR system.

A first aspect provides a wireless communication method, including:

transmitting, by a network device, at least one synchronization signal block to a terminal device on each of at least one frequency point, respectively;

transmitting, by the network device, first system information to the terminal device, where the first system information indicates a physical random access channel (PRACH) resource or a set of random access preambles corresponding to the at least one synchronization signal block transmitted on each frequency point, for random access of the terminal device.

Therefore, in the embodiments of the present application, a network device indicates, in the first system information, a physical random access channel (PRACH) resource or a set of random access preambles corresponding to at least one synchronization signal block transmitted on each of the at least one frequency point, so that configuration of the PRACH resource or the set of random access preambles can be implemented, as well as an association between the synchronization signal block and the PRACH resource or the set of random access preambles, thus the network device can get aware of a frequency position of a synchronous signal block detected by a terminal device when receiving a random access request message from the terminal device.

With reference to the first aspect, in a possible implementation manner of the first aspect, the first system information includes an association relationship corresponding to each frequency point, and the association relationship refers to an association relationship between at least one synchronization signal block transmitted on a corresponding frequency point and a PRACH resource or a set of random access preambles.

With reference to the first aspect or any of the above possible implementation manners, in another possible implementation manner of the first aspect, the first system information further includes a plurality of indication bits having a one-to-one correspondence to a plurality of frequency points, the plurality of frequency points includes the at least one frequency point, and the indication bit indicates whether the first system information includes the association relationship corresponding to a frequency point corresponding to the indication bit.

With reference to the first aspect or any of the above possible implementation manners, in another possible implementation manner of the first aspect, information of the association relationship of the at least one frequency point is included in the first system information according to an arrangement order of the plurality of indication bits between the at least one frequency point.

With reference to the first aspect or any of the above possible implementation manners, in another possible implementation manner of the first aspect, the first system information further includes: first frequency point information of a frequency point corresponding to each association relationship.

With reference to the first aspect or any of the above possible implementation manners, in another possible implementation manner of the first aspect, the first frequency point information indicates a first frequency domain offset between the frequency point on which the synchronization signal block is transmitted and a frequency point on which the first system information is transmitted.

With reference to the first aspect or any of the above possible implementation manners, in another possible implementation manner of the first aspect, the at least one synchronization signal block transmitted on each frequency point including second system information, the second system information including second frequency point information of each frequency point, and the second frequency point information indicates a second frequency domain offset between the frequency point on which the synchronization signal block is transmitted and the frequency point on which the first system information is transmitted.

With reference to the first aspect or any of the above possible implementation manners, in another possible implementation manner of the first aspect, a bit value of the first frequency point information is equal to a bit value of the second frequency point information.

With reference to the first aspect or any of the above possible implementation manners, in another possible implementation manner of the first aspect, a relative frequency position relationship between frequency points at which the first frequency domain offset is obtained is the same as a relative frequency position relationship between frequency points at which the second frequency domain offset is obtained.

With reference to the first aspect or any of the above possible implementation manners, in another possible implementation manner of the first aspect, the network device is preset with a first association relationship between a plurality of frequency values of frequency domain offsets and a plurality of first number values; the network device is preset with a second association relationship between a plurality of frequency values of frequency domain offsets and a plurality of second number values;

the first frequency point information includes: a first number value that corresponds to a frequency value of the first frequency domain offset and is obtained according to the first association relationship;

the second frequency point information includes: a second number value that corresponds to a frequency value of the second frequency domain offset and is obtained according to the second association relationship.

With reference to the first aspect or any of the above possible implementation manners, in another possible implementation manner of the first aspect, the frequency value of the first frequency domain offset is equal to the frequency value of the second frequency domain offset, and the first number value included in the first frequency point information is equal to the second number value included in the second frequency point information.

With reference to the first aspect or any of the above possible implementation manners, in another possible implementation manner of the first aspect, the frequency value of the first frequency domain offset and the frequency value of the second frequency domain offset are with opposite signs, and the first number value included in the first frequency point information is equal to the second number value included in the second frequency point information.

With reference to the first aspect or any of the above possible implementation manners, in another possible implementation manner of the first aspect, the second frequency point information includes: a frequency value of the second frequency domain offset.

With reference to the first aspect or any of the above possible implementation manners, in another possible implementation manner of the first aspect, the first frequency point information includes: a frequency value of the first frequency domain offset.

With reference to the first aspect or any of the above possible implementation manners, in another possible implementation manner of the first aspect, the first frequency point information includes a value of an absolute frequency point.

With reference to the first aspect or any of the above possible implementation manners, in another possible implementation manner of the first aspect, where the transmitting, by the network device, first system information to the terminal device includes:

transmitting, by the network device, the first system information to the terminal device on a frequency point.

With reference to the first aspect or any of the above possible implementation manners, in another possible implementation manner of the first aspect, where the transmitting, by a network device, at least one synchronization signal block to a terminal device on each of at least one frequency point, respectively includes:

transmitting, by the network device, a plurality of synchronization signal blocks to the terminal device on each frequency point, where the plurality of synchronization signal blocks being transmitted respectively through different transmission beams.

With reference to the first aspect or any of the above possible implementation manners, in another possible implementation manner of the first aspect, the method further includes:

receiving, by the network device, a random access message transmitted by the terminal device through a first PRACH resource, or receiving a random access message that includes a random access preamble in a first set of random access preambles;

determining, by the network device, according to the random access message, a first synchronization signal block corresponding to the first physical random access resource as a synchronization signal block for access of the terminal device.

With reference to the first aspect or any of the above possible implementation manners, in another possible implementation manner of the first aspect, the method further includes:

determining, by the network device, the first synchronization signal block as a synchronization signal block of a defined cell of the terminal device.

With reference to the first aspect or any of the above possible implementation manners, in another possible implementation manner of the first aspect, the method further includes:

determining a frequency domain reference point based on the synchronization signal block of the defined cell;

performing a resource allocation, partial configuration or scheduling of a bandwidth for the terminal device based on the frequency domain reference point.

A second aspect provides a wireless communication method, including:

acquiring, by a terminal device, first system information according to an indication of a detected first synchronization signal block, where the first system information indicates a physical random access channel (PRACH) resource or a set of random access preambles corresponding to at least one synchronization signal block transmitted on each of at least one frequency point, and the at least one synchronization signal block includes the first synchronization signal block;

determining, by the terminal device, from the first system information, a first PRACH resource or a first set of random access preambles corresponding to the first synchronization signal block;

performing random access through the first PRACH resource or the first set of random access preambles.

Therefore, in the embodiments of the present application, a network device indicates, in the first system information, a physical random access channel (PRACH) resource or a set of random access preambles corresponding to at least one synchronization signal block transmitted on each of the at least one frequency point, so that configuration of the PRACH resource or the set of random access preambles can be implemented, as well as an association between the synchronization signal block and the PRACH resource or the set of random access preambles, thus the network device can get aware of a frequency position of a synchronous signal block detected by a terminal device when receiving a random access request message from the terminal device.

With reference to the second aspect, in a possible implementation manner of the second aspect, the first system information includes an association relationship corresponding to each frequency point, and the association relationship refers to an association relationship between at least one synchronization signal block transmitted on a corresponding frequency point and a PRACH resource or a set of random access preambles;

where the determining, by the terminal device, from the first system information, a first PRACH resource or a first set of random access preambles corresponding to a frequency point occupied by the first synchronization signal block includes:

determining, by the terminal device, from the first system information, the association relationship corresponding to the frequency point occupied by the first synchronization signal block;

determining, by the terminal device, according to the association relationship corresponding to the frequency point occupied by the first synchronization signal block, the first PRACH resource or the first set of random access preambles.

With reference to the second aspect or any of the above possible implementation manners, in another possible implementation manner of the second aspect, the first system information further includes a plurality of indication bits having a one-to-one correspondence to a plurality of frequency points, the plurality of frequency points includes the at least one frequency point, and the indication bit indicates whether the first system information includes the association relationship corresponding to a frequency point corresponding to the indication bit; information of the association relationship of the at least one frequency point is included in the first system information according to an arrangement order of the plurality of indication bits between the at least one frequency point;

where the determining, by the terminal device, from the first system information, the association relationship corresponding to the frequency point occupied by the first synchronization signal block includes:

determining, by the terminal device, according to a position of the frequency point occupied by the first synchronization signal block in the plurality of indication bits, a position of the association relationship corresponding to the frequency point occupied by the first synchronization signal block in the first system information;

determining, by the terminal device, on the determined position and from the first system information, the association relationship corresponding to the frequency point occupied by the first synchronization signal block.

With reference to the second aspect or any of the above possible implementation manners, in another possible implementation manner of the second aspect, the first system information further includes: first frequency information of a frequency point corresponding to each association relationship;

where the determining, by the terminal device, from the first system information, the association relationship corresponding to the frequency point occupied by the first synchronization signal block includes:

determining, by the terminal device, according to second frequency point information of the frequency point occupied by the first synchronization signal block and first frequency point information of the at least one frequency point, from the first system information, the association relationship corresponding to the frequency point occupied by the first synchronization signal block.

With reference to the second aspect or any of the above possible implementation manners, in another possible implementation manner of the second aspect, the first frequency point information indicates a first frequency domain offset between a frequency point corresponding to the association relationship and a frequency point occupied by the first system information; the second frequency point information is included in second system information included in the first synchronization signal block, and the second frequency point information indicates a second frequency domain offset between the frequency point occupied by the first synchronization signal block and the frequency point occupied by the first system information;

where the determining, by the terminal device, the association relationship corresponding to the frequency point occupied by the first synchronization signal block includes:

determining, by the terminal device, according to the second frequency domain offset and the first frequency domain offset of the at least one frequency point, from the first system information, the association relationship corresponding to the frequency point occupied by the first synchronization signal block.

With reference to the second aspect or any of the above possible implementation manners, in another possible implementation manner of the second aspect, the first frequency point information includes a number value corresponding to a frequency value of the first frequency domain offset, and the second frequency point information includes a number value corresponding to a frequency value of the second frequency domain offset;

where the determining, by the terminal device, the association relationship corresponding to the frequency point occupied by the first synchronization signal block includes:

determining, by the terminal device, according to the number value included in the second system information and at least one number value included in the first system information, the association relationship corresponding to the frequency point occupied by the first synchronization signal block.

With reference to the second aspect or any of the above possible implementation manners, in another possible implementation manner of the second aspect, where the determining, by the terminal device, the association relationship corresponding to the frequency point occupied by the first synchronization signal block includes:

determining, in the at least one number value, an association relationship corresponding to a number value equal to the number value included in the second system information, as the association relationship corresponding to the frequency point occupied by the first synchronization signal block.

With reference to the second aspect or any of the above possible implementation manners, in another possible implementation manner of the second aspect, where the determining, by the terminal device, the association relationship corresponding to the frequency point occupied by the first synchronization signal block includes:

determining, according to a corresponding relationship between a plurality of first number values and a plurality of second number values, a first number value corresponding to the number value included in the second system information, where the first number value is a number value that can be carried in the first system information, and the second number value is a number value that can be carried in the second system information;

where the determining, by the terminal device, the association relationship corresponding to the frequency point occupied by the first synchronization signal block includes:

determining, in the at least one number value, an association relationship corresponding to a number value equal to the determined first number value, as the association relationship corresponding to the frequency point occupied by the first synchronization signal block.

With reference to the second aspect or any of the above possible implementation manners, in another possible implementation manner of the second aspect, where the determining, by the terminal device, the association relationship corresponding to the frequency point occupied by the first synchronization signal block includes:

determining, according to a second association relationship between a plurality of second number values and a plurality of frequency values of frequency domain offsets of second relative frequency position relationships, a frequency value of a frequency domain offset of a second relative frequency position relationship corresponding to the number value included in the second system information, where the second number value is a number value that can be carried in the second system information;

determining, according to the determined frequency value of the frequency domain offset of the second relative frequency position relationship, a frequency value of a frequency domain offset of a first relative frequency position relationship;

determining, according to a first association relationship between a plurality of first number values and a plurality of frequency values of frequency domain offsets of first relative frequency position relationships, and according to the determined frequency value of the frequency domain offset of the first relative frequency position relationship, a first number value corresponding to a number value included in the first system information, where the first number value is a number value that can be carried in the first system information;

determining, in the at least one number value, an association relationship corresponding to a number value equal to the determined first number value, as the association relationship corresponding to the frequency point occupied by the first synchronization signal block.

With reference to the second aspect or any of the above possible implementation manners, in another possible implementation manner of the second aspect, the first frequency point information is a value of an absolute frequency point included in the first system information; the second system information includes a value of an absolute frequency point occupied by the first synchronization signal block;

where the determining, by the terminal device, from the first system information, the association relationship corresponding to the frequency point occupied by the first synchronization signal block includes:

determining, in a value of an absolute frequency point of the at least one frequency point, an association relationship corresponding to a value of an absolute frequency point equal to the value of the absolute frequency point occupied by the first synchronization signal block, as the association relationship corresponding to the frequency point occupied by the first synchronization signal block.

In a third aspect, there is provided a network device for performing the method according to any above possible implementation manner of the first aspect or the first aspect as such. Specifically, the network device includes functional modules for performing the method according to any above possible implementation manner of the first aspect or the first aspect as such.

In a fourth aspect, there is provided a terminal device for performing the method according to any above possible implementation manner of the second aspect or the second aspect as such. Specifically, the terminal device includes functional modules for performing the method according to any above possible implementation manner of the second aspect or the second aspect as such.

In a fifth aspect, there is provided a network device including a processor, a memory and a transceiver. Through an internal connection path, the processor, the memory and the transceiver communicate with each other and transmit control and/or data signals, such that the terminal device performs the method according to any above possible implementation manner of the first aspect or the first aspect as such.

In a sixth aspect, there is provided a terminal device including a processor, a memory and a transceiver. Through an internal connection path, the processor, the memory and the transceiver communicate with each other and transmit control and/or data signals, such that the terminal device performs the method according to any above possible implementation manner of the second aspect or the second aspect as such.

In a seventh aspect, there is provided a computer readable medium for storing a computer program which includes instructions for performing any of the above methods or any possible implementation manners.

In an eighth aspect, there is provided a computer program product including instructions, when the computer program product, when executed on a computer, causes the computer to perform any of the above methods or the methods in any possible implementation manners.

BRIEF DESCRIPTION OF THE DRAWINGS

The appended drawings required in the description of the embodiment or the prior art are briefly described below to more clearly illustrate the technical solution of the embodiments of the present application. Apparently, the appended drawings in the following description are only some embodiments of the present application. Those skilled in the art can obtain other drawings according to these appended drawings without any creative labor.

DESCRIPTION OF EMBODIMENTS

The technical solution in the embodiments of the present application will be described below with reference to the appended drawings in the embodiment of the present application. Obviously, the described embodiments are part of the embodiments of the present application, and not all of them. All other embodiments obtained by those of ordinary skill in the art based on the embodiments of the present application without creative labor shall fall in the scope of protection of the present application.

Figure 1:
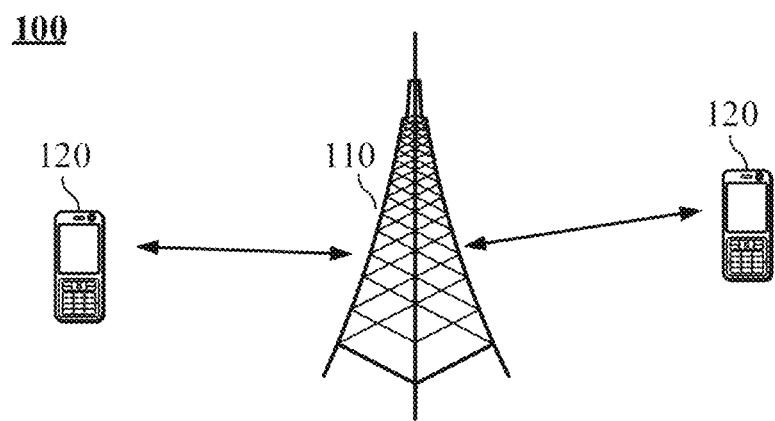
FIG. 1 is a schematic diagram of a wireless communication system according to an embodiment of the present application.

FIG. 1 illustrates a wireless communication system 100 applied to the embodiment of the present application. The wireless communication system 100 may include a network device 110. The network device 100 may be a device that communicates with a terminal device. The network device 100 may provide communication coverage for a specific geographic area, and may communicate with terminal devices (e.g., UEs) located within the coverage area. In an embodiment, the network device 100 may be a base transceiver station (BTS) in a GSM system or a CDMA system, or may be a NodeB (NB) in a WCDMA system, or may be an evolutional base station Node B, eNB or eNodeB in a LTE system, or a wireless controller in a cloud radio access network (CRAN), or the network device may be a relay station, an access point, an vehicle-mounted device, a wearable device, a network side device in a future 5G network or a network device in a future evolutional public land mobile network (PLMN), etc.

The wireless communication system 100 also includes at least one terminal device 120 located within the coverage area of the network device 110. The terminal device 120 can be mobile or fixed. In an embodiment, the terminal device 120 may refer to an access terminal, user equipment (UE), a subscriber unit, a subscriber station, a mobile station, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, a vehicle-mounted device, a wearable device, a terminal device in a 5G network, or a terminal device in a future evolutional PLMN, etc.

In an embodiment, a device to device (D2D) communication is available between the terminal devices 120.

In an embodiment, the 5G system or network may also be referred to as a New Radio (NR) system or network.

FIG. 1 exemplarily illustrates one network device and two terminal devices. In an embodiment, the wireless communication system 100 may include a plurality of network devices, and the coverage area of each network device may include an additional number of terminal devices, which is not limited in the embodiments of the present application.

In an embodiment, the wireless communication system 100 may further include other network entities, such as a network controller, a mobility management entity, which is not limited in the embodiments of the present application.

It should be understood that terms "system" and "network" are often used interchangeably herein. The term 'and/or" used herein merely refers to an correlation between associated objects, indicating that there may be three relationships, for example, A and/or B may indicate three cases: A exists separately, both A and B exist, or B exists separately. In addition, the character "/" used herein generally indicates that there is an "or" relationship between associated objects.

In the embodiments of the present application, the network device may transmit synchronization signal blocks to the terminal device, and each synchronization signal block may include a primary synchronization signal (PSS), a secondary synchronization signal (SSS), and a physical broadcasting channel (PBCH). The terminal device can search for an SS block in a system bandwidth to obtain a cell identifier (ID), time-frequency synchronization, obtain PBCH information, and perform a radio resource management (RRM) measurement based on the SSS and a demodulation reference signal (DMRS) of the PBCH.

In an embodiment, a network device may transmit at least one synchronization signal block on each of at least one frequency point, respectively.

For example, for a broadband component carrier with a bandwidth of 400 MHz or even 1 GHz, on the terminal side, terminal devices with multiple operating bandwidths are distributed within the same system broadband component carrier due to different usage scenarios and different cost considerations. For example, if the system bandwidth is 400 MHz, the terminal device with a bandwidth of 400 MHz may be distributed, and terminal devices with bandwidths of 100 MHz, 40 MHz, and 10 MHz may also be available. Thus, if there is only one synchronization signal block (SSB) position within the system broadband component carrier, the terminal with a smaller operating bandwidth may have no SS block within its operating bandwidth. Therefore, the terminal device should be tuned to the frequency position where the SS block is located when it needs to receive the SS block for the time-frequency synchronization and the radio resource management (RRM), and to read the physical broadcast channel (PBCH). On the other hand, for the broadband component carrier with an extremely large bandwidth, propagation characteristics of different frequency positions may behave much differently. For example, there is a big difference between the path loss in the high frequency band and the path loss in the low frequency band of the broadband component carrier.

Therefore, the network device can transmit the synchronization signal block on a plurality of frequency points, respectively.

In an embodiment, when a plurality of synchronization signal blocks are transmitted on a certain frequency point, different synchronization signal blocks may be transmitted through different beams.

In an embodiment, the synchronization signal block may be associated with a physical random access channel (PRACH).

Specifically, an association relationship between a synchronization signal block of each frequency point and a PRACH resource or a random access preamble may be set. When detecting the synchronization signal block at a specific frequency point, the terminal device may use the PRACH or the random access preamble associated with the synchronization signal block for random access. When receiving a random access request message from the terminal device, the network device can obtain the synchronization signal block currently detected by the terminal device. The network device determines the synchronization signal block as a synchronization signal block of a defined cell of the terminal device. And further, based on the synchronization signal block of the defined cell, the network device may determine a frequency domain reference point, and perform a resource allocation, partial configuration or scheduling of a bandwidth for the terminal device.

In an embodiment, the association relationship between the synchronization signal block and a PRACH resource or the random access preamble mentioned in the embodiments of the present application may be an association relationship between the actually transmitted synchronization signal block and the PRACH resource or the random access preamble.

Figure 2:
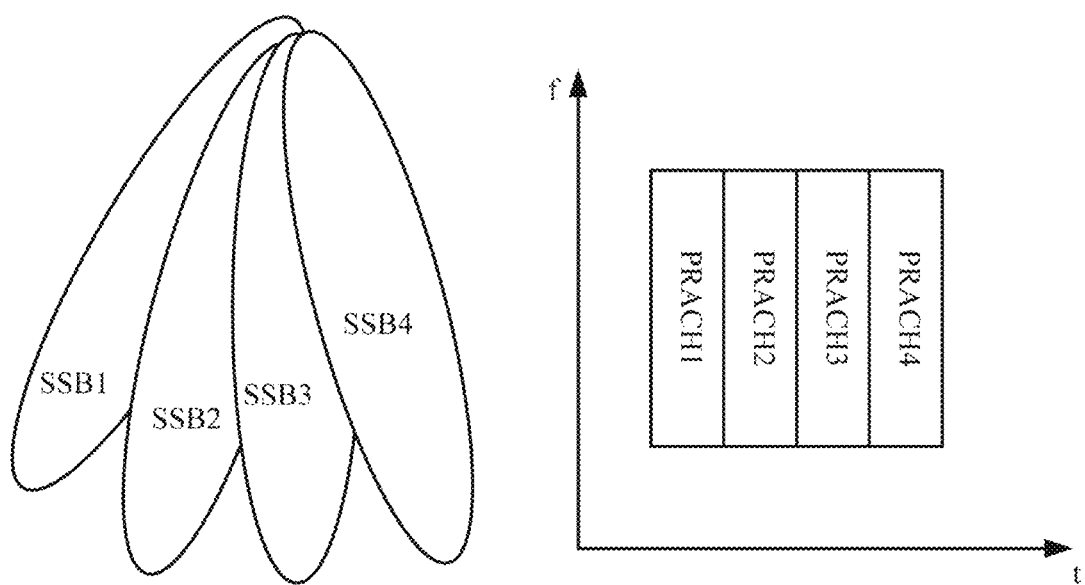
FIG. 2 is a schematic diagram of a corresponding relationship between SSB and PRACH resources according to an embodiment of the present application.

In an embodiment, as shown in FIG. 2, in case that the reciprocity exists among next generation base station (gNB) UL/DL (uplink/downlink UL/DL) beams, one or more DL SS Blocks correspond to one PRACH resource subset (or one preamble subset). For example, the PRACH resource subset corresponding to SSB1 includes a PRACH resource 1, the PRACH resource subset corresponding to SSB2 includes a PRACH resource 2, the PRACH resource subset corresponding to SSB3 includes a PRACH resource 3, and the PRACH resource subset corresponding to SSB4 includes a PRACH resource 4.

Figure 3:
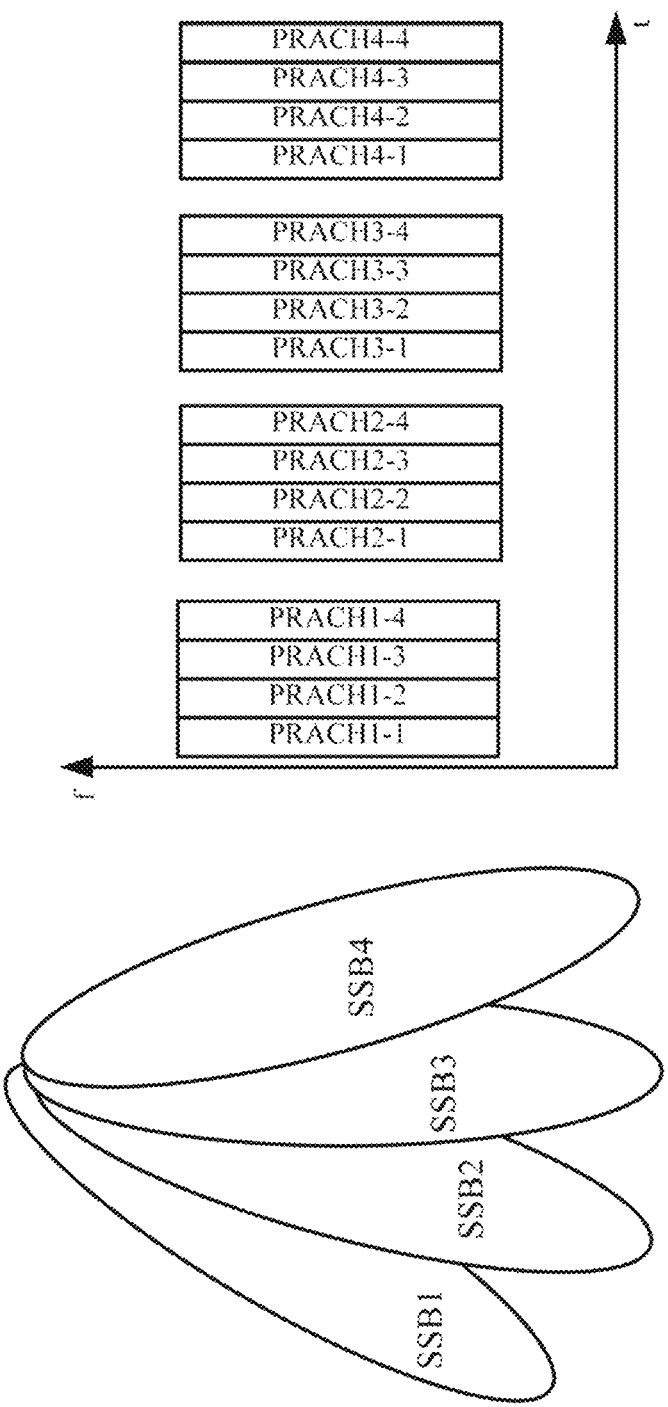
FIG. 3 is a schematic diagram of a corresponding relationship between SSB and PRACH resources according to an embodiment of the present application.

In an embodiment, as shown in FIG. 3, in case that there is no reciprocity among gNB UL/DL beams, one DL SS Block corresponds to one PRACH resource set (or one preamble set). For example, the PRACH resource set corresponding to SSB1 includes: PRACH resources 1-1, 1-2, 1-3, and 1-4; the PRACH resource set corresponding to SSB2 includes: PRACH resources 2-1, 2-2, 2-3, and 2-4; the PRACH resource set corresponding to SSB3 includes: PRACH resources 3-1, 3-2, 3-3, and 3-4, and the PRACH resource set corresponding to SSB4 includes: PRACH resources 4-1, 4-3, 4-3 and 4-4.

In an embodiment, the PBCH included in the synchronization signal block may carry system information, and the system information may indicate a frequency domain position where the RMSI is located, where the RMSI may carry the association relationship between the synchronization signal block corresponding to the frequency point where the synchronization signal block is located and the PRACH resource or the random access preamble.

In an embodiment, when the SSB is transmitted on multiple frequency points, respectively, the SSB and the RMSI may also have a many-to-one relationship, that is, SSBs on multiple frequency points correspond to the same RMSI.

In the following, reference may be made to FIG. 4 about how to configure the physical random access channel or random access preamble associated with the synchronization signal block.

Figure 4:
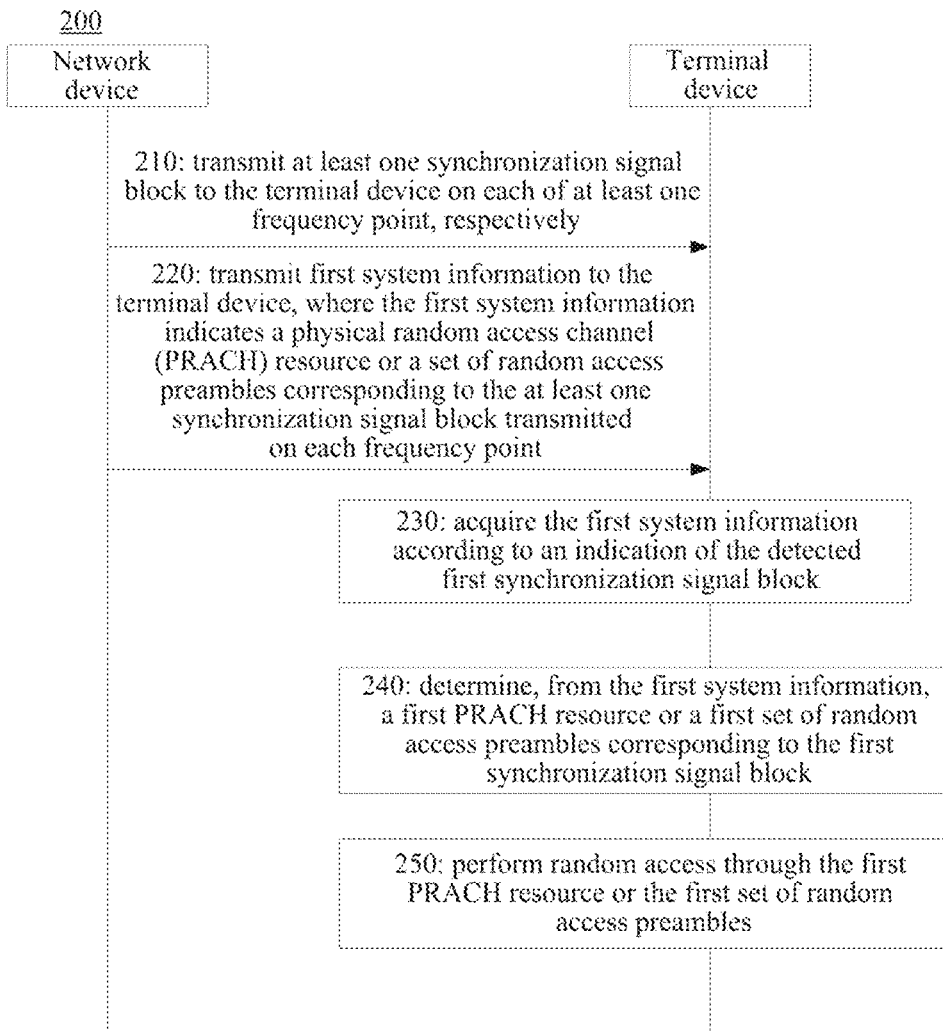
FIG. 4 is a schematic flowchart of a wireless communication method according to an embodiment of the present application.

FIG. 4 is a schematic flowchart of a wireless communication method 200 according to an embodiment of the present application. The method 200 is In an embodiment applicable to the system shown in FIG. 1, but is not limited thereto. The method 200 includes at least part of the following.

In 210, a network device transmits at least one synchronization signal block to a terminal device on each of at least one frequency point, respectively.

Specifically, the network device may transmit one or more synchronization signal blocks at a single frequency point to the terminal device, and when a plurality of synchronization signal blocks are transmitted, the transmission beam for each synchronization signal block may be different.

In an embodiment, each synchronization signal block may include a PSS, an SS, and a PBCH. Where second system information may be carried in the PBCH, and the second system information may indicate a frequency domain position of first system information, where the first system information may carry configuration information of the PRACH resource and/or the random access preamble.

In 220, the network device transmits the first system information to the terminal device, where the first system information indicates a physical random access channel (PRACH) resource or a set of random access preambles corresponding to the at least one synchronization signal block transmitted on each frequency point, for random access of the terminal device.

Specifically, the network device may carry configuration information of the PRACH resource and/or the random access preamble in the first system information, where the configuration information may be used to configure the PRACH resources and/or the set of random access preambles corresponding to the synchronization signal blocks transmitted on the frequency points.

In an embodiment, the first system information may be remaining minimum system information (RMSI), and may also carry other configuration information in addition to the configuration information of PRACH resources and/or the set of random access preambles.

In an embodiment, the first system information can be transmitted through a single frequency point.

In 230, the terminal device acquires the first system information according to an indication of the detected first synchronization signal block, where the at least one synchronization signal block described in 210 includes the first synchronization signal block.

Specifically, the terminal device may detect the synchronization signal block, and may determine the frequency domain position of the first system information according to an indication of the second system information included in the PBCH in the detected first synchronization signal block, and get the first system information at the corresponding frequency domain position.

In 240, the terminal device determines, from the first system information, a first PRACH resource or a first set of random access preambles corresponding to the first synchronization signal block.

Specifically, since the first system information indicates the PRACH resource and/or the set of random access preambles corresponding to the at least one synchronization signal block on each frequency point, the terminal device may determine the first PRACH resource or the first set of random access preambles corresponding to the detected first synchronization signal block.

In 250, the terminal device performs random access through the first PRACH resource or the first set of random access preambles.

In an embodiment, the network device may determine a frequency point of the RMSI by receiving a PRACH signal (for example, Message 1 (MSG1) in the random access process) transmitted by the terminal device and then obtaining the RMSI for the configuration of the PRACH resource.

In an embodiment, one synchronization signal block may correspond to one or more PRACH resources, and the terminal device may transmit the random access request message through one PRACH resource in the one or more PRACH resources corresponding to the first synchronization signal block.

In an embodiment, a synchronization signal block may correspond to a set of random access preambles, and the terminal device may carry, in the transmitted random access request message, one random access preamble in the set of random access preambles corresponding to the first synchronization signal block.

In an embodiment, the first system information includes an association relationship corresponding to each frequency point, and the association relationship is the association relationship between the synchronization signal block transmitted on a corresponding frequency point and a PRACH resource or a random access preamble.

In this case, for the terminal device, it is assumed that the terminal device detects the first synchronization signal block in the at least one synchronization signal block, then, the association relationship corresponding to the frequency point occupied by the first synchronization signal block may be determined from the first system information; and the first PRACH resource or the first set of random access preambles is determined according to the association relationship corresponding to the frequency point occupied by the first synchronization signal block.

Specifically, the first system information may include respectively, for each frequency point, an association relationship between the at least one synchronization signal block and the PRACH resource or the set of random access preambles, where the synchronization signal blocks may have a one-to-one correspondence to the PRACH resources or the set of random access preambles, or one synchronization signal block may correspond to a plurality of PRACH resources or a plurality of sets of random access preambles, or a plurality of synchronization signal blocks may correspond to one PRACH resource or one set of random access preambles.

In an embodiment, when the first system information carries the association relationship corresponding to each frequency point in the at least one frequency point, the terminal device needs to know the exact association relationship of the specific frequency point, and the embodiments of the present application may enable the terminal device to know the exact association relationship of the specific frequency point in terms of the information carried in the first system information.

In an implementation manner, the first system information may have an area for carrying association relationships corresponding to a certain number of frequency points, it may carry an association relationship corresponding to each frequency point in the corresponding area. If no synchronization signal block is transmitted on a certain frequency point, an area corresponding to the frequency point may carry a specific value indicates that there is no association relationship corresponding to this frequency point. For example, values of bits in the area corresponding to this frequency point are all set to zero.

In this case, for the terminal device, it is assumed that the terminal device detects the first synchronization signal block, the terminal device may read the corresponding association relationship in a preset area of the first system information where the association relationship corresponding to the frequency point occupied by the first synchronization signal block is located.

In an implementation manner, the first system information includes a plurality of indication bits having a one-to-one correspondence to a plurality of frequency points, the plurality of frequency points includes the at least one frequency point, and the indication bit indicates whether the first system information includes an association relationship corresponding to a frequency point corresponding to the indication bit.

In an embodiment, information of the association relationship of the at least one frequency point is included in the first system information according to an arrangement order of the plurality of indication bits between the at least one frequency point.

Specifically, it is assumed that there are a first, a second, a third, a fourth and a fifth frequency point, and the first system information carries the association relationships of the first, the second, and the fifth frequency points, then five indication bits such as 11,001 may be carried, and the association relationships corresponding to the first, the second, and the fifth frequency points may be included in the first system information in the order of the first, the second, and the fifth frequency points.

In this case, for the terminal device, it is assumed that the terminal device detects the first synchronization signal block, a position of the association relationship corresponding to the frequency point occupied by the first synchronization signal block in the first system information may be determined according to a position of the frequency point occupied by the first synchronization signal block in the plurality of indication bits.

In an implementation manner, the first frequency point information of a frequency point corresponding to each association relationship may be included in the first system information.

Specifically, the association relationship corresponding to a frequency point on which the synchronization signal block is transmitted and the frequency point information of this frequency point may be carried in the first system information, so as to notify the network device of the frequency point to which the carried association relationship belongs, or which is the association relationship of the frequency point.

In this case, for the terminal device, it is assumed that the first synchronization signal block is detected, the corresponding association relationship may be found according to the frequency point information of the frequency point occupied by the first synchronization signal block and the frequency point information of the frequency points corresponding to the association relationships in the first system message.

In an embodiment, the at least one synchronization signal block transmitted on each frequency point including second system information including the second frequency point information of each frequency point.

In this case, it is assumed that the first synchronization signal block is detected, the terminal device may determine the association relationship corresponding to the frequency point occupied by the first synchronization signal block from the first system information according to the second frequency point information included in the second system information and the first frequency point information of the at least one frequency point.

Specifically, the association relationship corresponding to the first frequency point information which matches with second frequency point information of the frequency point occupied by the first synchronization signal block may be determined as the association relationship corresponding to the frequency point occupied by the first synchronization signal block.

In an embodiment, the second frequency point information indicates a second frequency domain offset between the frequency point on which the synchronization signal block is transmitted and the frequency point on which the first system information is transmitted.

Where the second frequency domain offset may be a frequency domain offset of the frequency point on which the synchronization signal block is transmitted relative to the frequency point on which the first system information is transmitted. In this case, a reference point at which the second frequency domain offset is obtained may be the frequency point on which the first system information is transmitted.

In an embodiment, the second frequency domain offset may be an offset of the frequency point on which the first system information is transmitted relative to the frequency point on which the synchronization signal block is transmitted. In this case, a reference point at which the second frequency domain offset is obtained may be the frequency point on which the synchronization signal block is transmitted.

Figure 5:
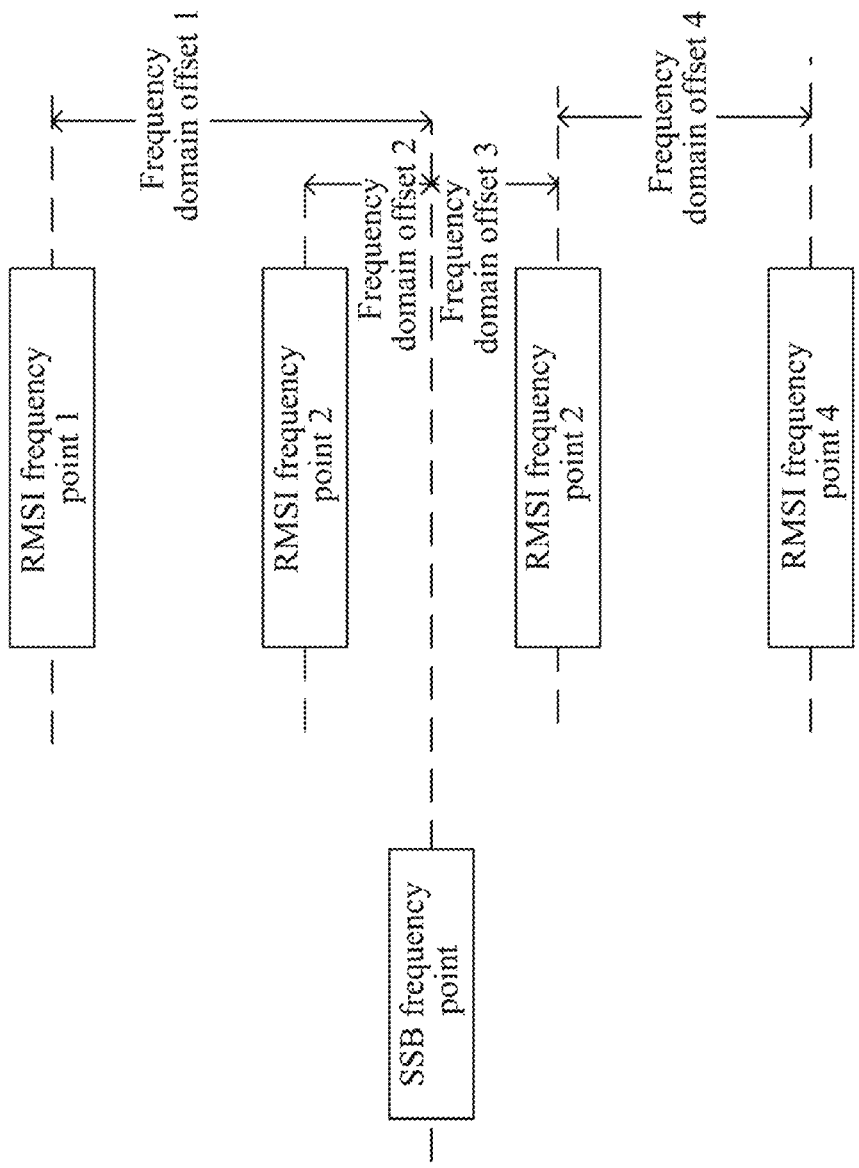
FIG. 5 is a schematic diagram of a frequency domain offset between a PBCH and RMSI according to an embodiment of the present application.

For example, as shown in FIG. 5, it is assumed that the RMSI corresponding to the synchronization signal block transmitted on a specific frequency point f0 can be transmitted on any of a plurality of frequency points, where the offset of a frequency point f1 which can be used for transmitting the RMSI and is relative to the specific frequency point f0 may be a frequency domain offset 1; the offset of frequency point f2 which can be used for transmitting the RMSI and is relative to the specific frequency point f0 may be frequency domain offset 2; the offset of frequency point f3 which can be used for transmitting the RMSI and is relative to the specific frequency point f0 may be frequency domain offset 3; the offset of frequency point f4 which can be used for transmitting the RMSI and is relative to the specific frequency point f0 may be frequency domain offset 4.

The network device may search for a number value corresponding to an indication bit in the PBCH of a corresponding frequency offset (i.e., a frequency domain offset) after selecting the frequency point for transmitting the RMSI. For example, as shown in Table 1 below.

TABLE 1

| | Indication bit in the PBCH | | | |
|---|---|---|---|---|
| | 00 | 01 | 10 | 11 |
| Frequency domain offset of the RMSI relative to the PBCH | Frequency domain offset 1 | Frequency domain offset 2 | Frequency domain offset 3 | Frequency domain offset 4 |

In an embodiment, the first frequency point information indicates a first frequency domain offset between the frequency point on which the synchronization signal block is transmitted and the frequency point on which the first system information is transmitted.

In this case, it is assumed that the first synchronization signal block is detected, the terminal device determines the association relationship corresponding to the frequency point occupied by the first synchronization signal block from the first system information according to the second frequency domain offset indicated by the first frequency point information in the first synchronization signal block and the first frequency domain offset of the at least one frequency point.

In an embodiment, the first frequency domain offset may be a frequency domain offset of the frequency point on which the synchronization signal block is transmitted relative to the frequency point on which the first system information is transmitted. In this case, a reference point at which the first frequency domain offset is obtained may be the frequency point on which the first system information is transmitted.

Figure 6:
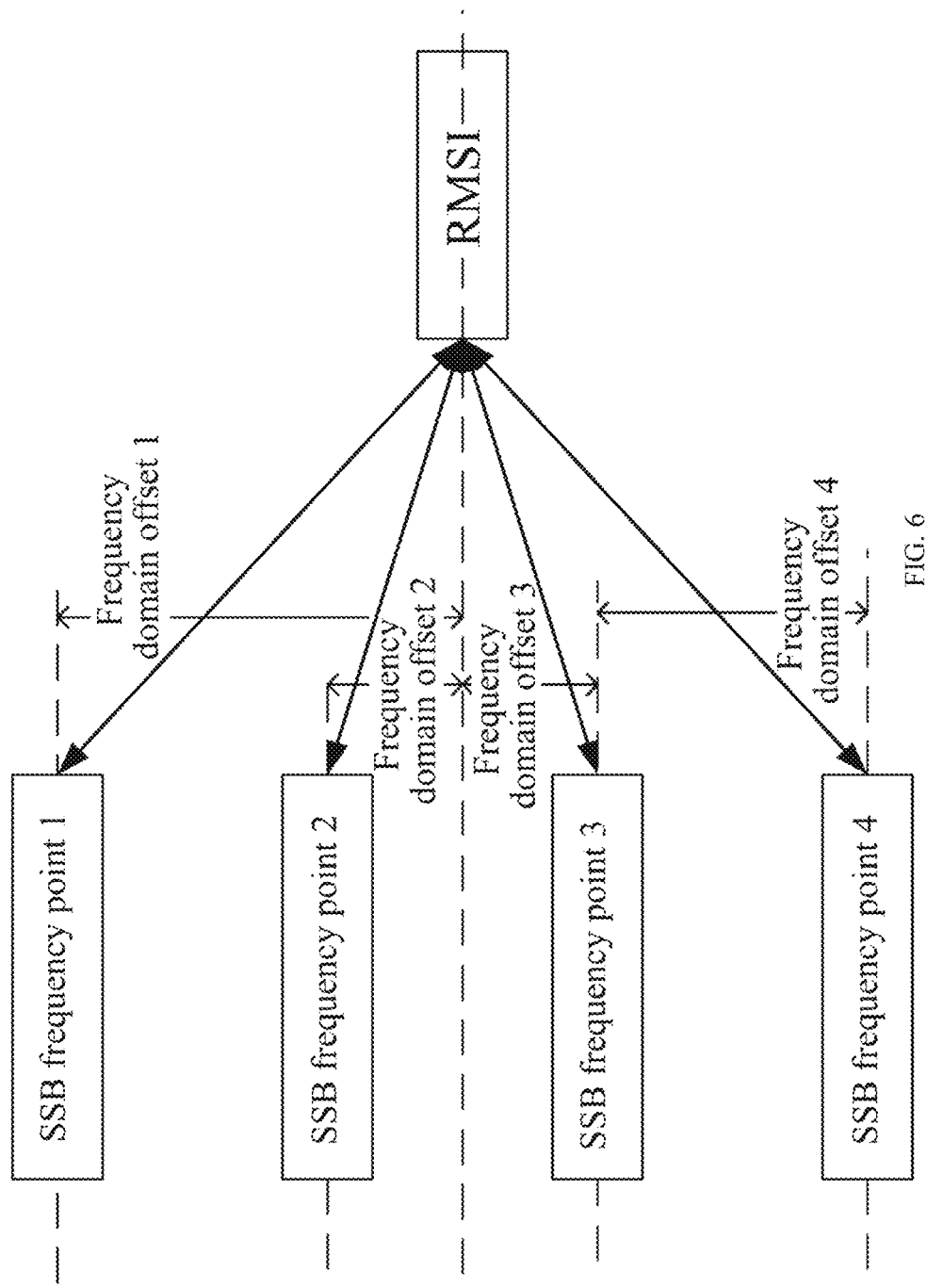
FIG. 6 is a schematic diagram of a frequency domain offset between a PBCH and RMSI according to an embodiment of the present application.

For example, as shown in FIG. 6, the frequency domain offset of the frequency point occupied by the RMSI relative to an SSB frequency point 1 is a frequency domain offset 1; the frequency domain offset of the frequency point occupied by the RMSI relative to an SSB frequency point 2 is a frequency domain offset 2; the frequency domain offset of the frequency point occupied by the RMSI relative to an SSB frequency point 3 is a frequency domain offset 3; the frequency domain offset of the frequency point occupied by the RMSI relative to an SSB frequency point 4 is a frequency domain offset 4. Where the frequency point information about the SSB frequency point 1 in the RMSI may be multiplexed with the frequency offset bit 11 of the RMSI relative to the PBCH indicated by the PBCH in the SSB frequency point 1; the frequency point information about the SSB frequency point 2 in the RMSI may be multiplexed with the frequency offset bit 10 of the RMSI relative to the PBCH indicated by the PBCH in the SSB frequency point 2; the frequency point information about the SSB frequency point 3 in the RMSI may be multiplexed with the frequency offset bit 01 of the RMSI relative to the PBCH indicated by the PBCH in the SSB frequency point 3; the frequency point information about the SSB frequency point 4 in the RMSI may be multiplexed with the frequency offset bit 00 of the RMSI relative to the PBCH indicated by the PBCH in the SSB frequency point 4. Where the specific table can be as shown in Table 2 below.

TABLE 2

| | Indication bit in the PBCH | | | |
|---|---|---|---|---|
| | 00 | 01 | 10 | 11 |
| Frequency domain offset of the RMSI relative to the PBCH | Frequency domain offset 1 | Frequency domain offset 2 | Frequency domain offset 3 | Frequency domain offset 4 |

In an embodiment, the first frequency domain offset may be the frequency point on which the first system information is transmitted relative to the frequency point on which the synchronization signal block is transmitted, and in this case, the reference point at which the first frequency domain offset is obtained may be the reference point on which the synchronization signal block is transmitted.

In an embodiment, a relative frequency position relationship between the frequency points at which the first frequency domain offset is obtained is the same as a relative frequency position relationship between the frequency points at which the second frequency domain offset is obtained.

For example, the first frequency domain offset is a frequency domain offset of the frequency point on which the synchronization signal block is transmitted relative to the frequency point on which the first system information is transmitted, and the second frequency domain offset is a frequency domain offset of the frequency point on which the synchronization signal block is transmitted relative to the frequency point on which the first system information is transmitted; or the first frequency domain offset may be an offset of the frequency point on which the first system information is transmitted relative to the frequency point on which the synchronization signal block is transmitted, and the second frequency domain offset may be an offset of the frequency point on which the first system information is transmitted relative to the frequency point on which the synchronization signal block is transmitted.

In an embodiment, the relative frequency position relationship between the frequency points at which the first frequency domain offset is obtained is different from the relative frequency position relationship between the frequency points at which the second frequency domain offset is obtained.

For example, the first frequency domain offset is a frequency domain offset of the frequency point on which the synchronization signal block is transmitted relative to the frequency point on which the first system information is transmitted, and the second frequency domain offset is a frequency domain offset of the frequency point on which the first system information is transmitted relative to the frequency point on which the synchronization signal block is transmitted; or the first frequency domain offset may be an offset of the frequency point on which the first system information is transmitted relative to the frequency point on which the synchronization signal block is transmitted, and the second frequency domain offset may be a frequency domain offset of the frequency point on which the synchronization signal block is transmitted relative to the frequency point on which the first system information is transmitted.

In an embodiment, the first frequency point information may indicate the first frequency domain offset by carrying a frequency value of the first frequency domain offset, or may indicate the first frequency domain offset by carrying a number value corresponding to the frequency value of the first frequency domain offset.

In an embodiment, the second frequency point information may indicate the second frequency domain offset by carrying a frequency value of the second frequency domain offset, or may indicate the second frequency domain offset by carrying a number value corresponding to the frequency value of the second frequency domain offset.

In an embodiment, when the first frequency point information indicates the first frequency domain offset, and the second frequency point information indicates the second frequency domain offset, a bit value of the first frequency point information is equal to a bit value of the second frequency point information.

For example, the first frequency point information and the second frequency point information respectively carry the value of the frequency domain offset, then the bit value of the first frequency point information and the bit value of the second frequency point information may be the same.

For example, the first frequency point information and the second frequency point information respectively carry the number value of the frequency domain offset, then the bit value of the first frequency point information and the bit value of the second frequency point information may be the same.

In an embodiment, the network device is preset with a first association relationship between a plurality of frequency values of frequency domain offsets and a plurality of first number values; the first frequency point information includes: a first number value that corresponds to a frequency value of the first frequency domain offset and is obtained according to the first association relationship.

Where the frequency domain offset corresponding to the frequency value in the first association relationship may be a frequency domain offset of the frequency point on which the synchronization signal block is transmitted relative to the frequency point on which the first system information is transmitted, or may be a frequency domain offset of the frequency point on which the first system information is transmitted relative to the frequency point on which the synchronization signal block is transmitted.

In an embodiment, the network device is preset with a second association relationship between a plurality of frequency values of frequency domain offsets and a plurality of second number values; the second frequency point information includes: a second number value that corresponds to a frequency value of the second frequency domain offset and is obtained according to the second association relationship.

Where the frequency domain offset corresponding to the frequency value in the second association relationship may be a frequency domain offset of the frequency point on which the synchronization signal block is transmitted relative to the frequency point on which the first system information is transmitted, or may be a frequency domain offset of the frequency point on which the first system information is transmitted relative to the frequency point on which the synchronization signal block is transmitted.

In an embodiment, the first association relationship and the second association relationship may be the same association relationship. In this case, the network device presetting the first association relationship and the second association relationship is to preset one association relationship, and the preset association relationship can be used as the first association relationship or as the second association relationship.

For example, as shown in Table 3 below, the number values shown in Table 3 can be carried in the RMSI or in the PBCH.

TABLE 3

| | Frequency domain offset of the RMSI relative to the PBCH | | | |
| --- | --- | --- | --- | --- |
| | 40M | 20M | 0M | −20M |
| Number value | 00 | 01 | 10 | 11 |

In an embodiment, the number value in the first association relationship may be a first number value carried in the RMSI, and the number value in the second association relationship may also specifically refer to a number value carried in the PBCH. For example, as shown in Table 4 below.

TABLE 4

| | Frequency domain offset of the RMSI relative to the PBCH | | | |
| --- | --- | --- | --- | --- |
| | 40M | 20M | 0M | −20M |
| Number value in the indication bits for the RMSI | 00 | 01 | 10 | 11 |
| Number value in the indication bits for the PBCH | 00 | 01 | 10 | 11 |

It should be understood that, although the first association relationship and the second association relationship in Table 4 are shown in one table, the embodiments of the present application are not limited thereto. For example, the first association relationship can be as shown in Table 5 below, and the second association relationship can be as shown in Table 6 below.

TABLE 5

| | Frequency domain offset of the RMSI relative to the PBCH | | | |
| --- | --- | --- | --- | --- |
| | 40M | 20M | 0M | −20M |
| Number value in the indication bits for the RMSI | 00 | 01 | 10 | 11 |

TABLE 6

| | Frequency domain offset of the RMSI relative to the PBCH | | | |
|---|---|---|---|---|
| | 40M | 20M | 0M | −20M |
| Number value in the indication bits for the PBCH | 00 | 01 | 10 | 11 |

In an embodiment, the relative frequency domain position relationship between frequency points of the frequency domain offset in the first association relationship may be opposite to the relative frequency domain position between frequency points of the frequency domain offset in the second association relationship.

In this case, in the two association relationships, for the frequency values of the frequency domain offsets opposite to each other (one positive and one negative) caused by the different relative frequency domain position relationships, the corresponding number values may be the same or different.

For example, as shown in Table 7 and Table 8 below, for the frequency values of the frequency domain offsets opposite to each other (one positive and one negative) caused by the different relative frequency domain position relationships, the corresponding number values may be the same.

TABLE 7

| | Frequency domain offset of the PBCH relative to the RMSI | | | |
|---|---|---|---|---|
| | −40M | −20M | −0M | 20M |
| Number value in the indication bits for the PBCH | 00 | 01 | 10 | 11 |

TABLE 8

| | Frequency domain offset of the RMSI relative to the PBCH | | | |
|---|---|---|---|---|
| | 40M | 20M | 0M | −20M |
| Number value in the indication bits for the PBCH | 00 | 01 | 10 | 11 |

For example, as shown in Table 9 and Table 10 below, for the frequency values of the frequency domain offsets opposite to each other (one positive and one negative) caused by the different relative frequency domain position relationships, the corresponding number values may be different.

TABLE 9

| | Frequency domain offset of the PBCH relative to the RMSI | | | |
|---|---|---|---|---|
| | −40M | −20M | −0M | 20M |
| Number value in the indication bits for the RMSI | 11 | 10 | 01 | 00 |

TABLE 10

| | Frequency domain offset of the RMSI relative to the PBCH | | | |
|---|---|---|---|---|
| | 40M | 20M | 0M | −20M |
| Number value in the indication bits for the PBCH | 00 | 01 | 10 | 11 |

In the embodiments of the present application, if the first system information and the second system information included in the synchronization signal block both carry the number values, if detecting a first synchronization signal block, the terminal device determines an association relationship corresponding to a frequency point where the first synchronization signal block is located according to a second number value included in the second system information and the at least one number value in the first system information.

For ease of understanding, several implementation manners are described below.

In an implementation, the terminal device may determine, in the at least one number value included in the first system information, an association relationship corresponding to a number value equal to the number value included in the second system information in the first synchronization signal block, as the association relationship corresponding to the frequency point occupied by the first synchronization signal block.

In another implementation manner, the first number value corresponding to the number value included in the second system information included in the first synchronization signal block is determined according to a corresponding relationship between a plurality of first number values and a plurality of second number values, where the first number value is a number value that can be carried in the first system information, and the second number value is a number value that can be carried in the second system information; the association relationship, corresponding to a number value equal to the determined first number value in the at least one number value included in the first system information, is determined as the association relationship corresponding to the frequency point occupied by the first synchronization signal block.

For example, the corresponding relationship between the plurality of first number values and the plurality of second number values may be as shown in Table 11 below.

TABLE 11

| | Number value in the indication bits for the PBCH | | | |
|---|---|---|---|---|
| | 11 | 10 | 01 | 00 |
| Number value in the indication bits for the RMSI | 00 | 01 | 10 | 11 |

In an implementation manner, a frequency value of a frequency domain offset of a second relative frequency position relationship corresponding to the number value included in the second system information is determined according to a second association relationship between a plurality of second number values and a plurality of frequency values of frequency domain offsets of second relative frequency position relationships, where the second numbered value is a number value that can be carried in the second system information; a frequency value of a frequency domain offset of a first relative frequency position relationship is determined according to the determined frequency value of the frequency domain offset of the second relative frequency position relationship; a first number value corresponding to a number value included in the first system information is determined according to a first association relationship between a plurality of first number values and a plurality of frequency values of frequency domain offsets of first relative frequency position relationships, and according to the determined frequency value of the frequency domain offset of the first relative frequency position relationship, where the first number value is a number value that can be carried in the first system information; an association relationship corresponding to a number value equal to the determined first number value in the at least one number value is determined as the association relationship corresponding to the frequency point occupied by the first synchronization signal block.

In an embodiment, the first relative frequency position relationship may be a position relationship of a frequency point occupied by the synchronization signal block relative to a frequency point occupied by the first system information, and the second relative frequency position relationship may be a position relationship of the frequency point occupied by the first system information relative to the synchronization signal block.

In an embodiment, the first relative frequency position relationship may be a position relationship of the frequency point occupied by the first system information relative to the frequency point occupied by the synchronization signal block, and the second relative frequency position relationship may be a position relationship of the frequency point occupied by the synchronization signal block relative to the first system information.

Where the second association relationship between the plurality of second number values and the plurality of frequency values of the frequency domain offsets of the second relative frequency position relationships may be as shown in Table 12 below.

TABLE 12

| | Frequency domain offset of the RMSI relative to the PBCH | | | |
|---|---|---|---|---|
| | 40M | 20M | 0M | −20M |
| Number value in the indication bits for the PBCH | 00 | 01 | 10 | 11 |

Where the first association relationship between the plurality of first number values and the plurality of frequency values of the frequency domain offsets of the first relative frequency position relationships may be as shown in Table 13 below.

TABLE 13

| | Frequency domain offset of the PBCH relative to the RMSI | | | |
|---|---|---|---|---|
| | −40M | −20M | −0M | 20M |
| Number value in the indication bits for the RMSI | 11 | 10 | 01 | 00 |

In the above description, the first frequency point information and the second frequency point information respectively include the number value corresponding to the first frequency domain offset and the number value of the second frequency domain offset, but it should be understood that the embodiments of the present application are not limited thereto.

For example, the second frequency point information may include a frequency value of the second frequency domain offset. In this case, the first frequency point information may include a frequency value of the first frequency domain offset, or may include the number value corresponding to the first frequency domain offset, or may include a value of an absolute frequency point.

For another example, the first frequency point information may include a frequency value of the first frequency domain offset. In this case, the second frequency point information may include a frequency value of the second frequency domain offset, or may include the number value corresponding to the second frequency domain offset, or may include the value of the absolute frequency point.

For example, the first frequency point information may include a frequency value of the absolute frequency point. In this case, after detecting the first synchronization signal block, the terminal device may determine, in the at least one frequency point corresponding to the first system information, an association relationship corresponding to a frequency point equal to the frequency point occupied by the detected first synchronization signal block as the association relationship corresponding to the frequency point occupied by the first synchronization signal block.

In the embodiments of the present application, the frequency point occupied by the SSB or the frequency point on which SSB is transmitted may be equally replaced by the frequency point of the SSB.

In the embodiments of the present application, the frequency point occupied by the RMSI or the frequency point on which the RMSI is transmitted may be equally replaced by the frequency point of the RMSI or the frequency point corresponding to the RMSI.

In an embodiment, the frequency point of the SSB, or the frequency point occupied by the SSB, or the frequency point on which the SSB is transmitted may be: any of the frequency points carrying the SSB, for example, it may be a center frequency point of the SSB, or may be a frequency point corresponding to the minimum physical resource block (PRB) or a frequency point corresponding to the maximum PRB.

In an embodiment, the frequency point of the RMSI, or the frequency point occupied by the RMSI, or the frequency point on which the RMSI is transmitted may be: any of the frequency points of a RMSI control resource set (e.g., a Control Resource Set, CORESET), for example, a center frequency point of the RMSI CORESET; or a frequency point corresponding to the minimum PRB in the RMSI CORESET, or a frequency point corresponding to the maximum PRB in the RMSI CORESET, etc.

In an embodiment, the frequency point of the RMSI, or the frequency point occupied by the RMSI, or the frequency point on which the RMSI is transmitted may be: any of the frequency points of a RMSI physical downlink shared channel (PDSCH), for example, a center frequency point of the RMSI PDSCH, or a frequency point corresponding to the minimum PRB of the RMSI PDSCH, or a frequency point corresponding to the maximum PRB of the RMSI PDSCH, etc.

Therefore, in the embodiments of the present application, a network device indicates, in the first system information, a physical random access channel (PRACH) resource or a set of random access preambles corresponding to at least one synchronization signal block transmitted on each of the at least one frequency point, so that configuration of the PRACH resource or the set of random access preambles can be implemented, as well as an association between the synchronization signal block and the PRACH resource or the set of random access preambles, thus the network device can get aware of a frequency position of a synchronous signal block detected by a terminal device when receiving a random access request message from the terminal device.

Figure 7:
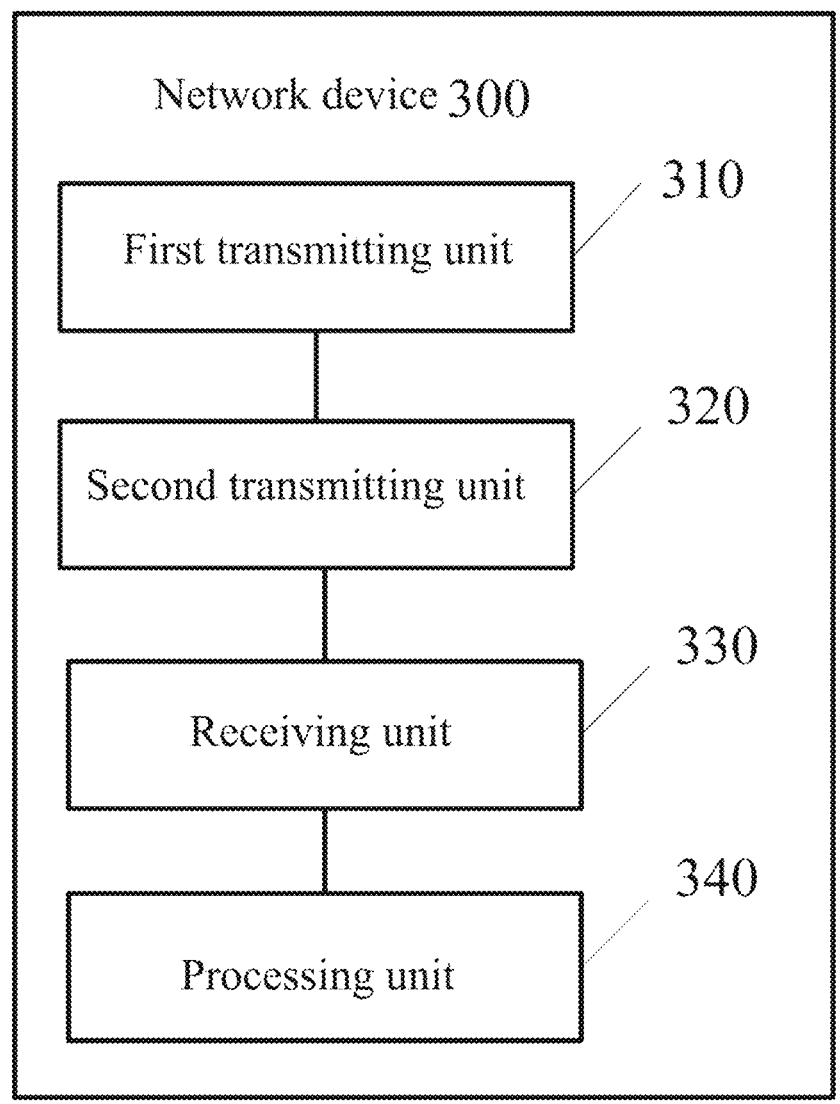
FIG. 7 is a schematic structural diagram of a network device according to an embodiment of the present application.

FIG. 7 is a schematic structural diagram of a network device 300 according to an embodiment of the present application. As shown in FIG. 7, the network device 300 includes a first transmitting unit 310 and a second transmitting unit 320; where:

the first transmitting unit 310 is configured to: transmit at least one synchronization signal block to a terminal device on each of at least one frequency point, respectively;

the second transmitting unit 320 is configured to: transmit the first system information to the terminal device, where the first system information indicates a physical random access channel (PRACH) resource or a set of random access preambles corresponding to the at least one synchronization signal block transmitted on each frequency point, for random access by the terminal device.

In an embodiment, as shown in FIG. 7, the network device 300 further includes a receiving unit 330 and a processing unit 340; where:

the receiving unit 330 is configured to: receive a random access message transmitted by the terminal device through a first PRACH resource, or receive a random access message that includes a random access preamble in a first set of random access preambles;

the processing unit 340 is configured to: determine, according to the random access message, a first synchronization signal block corresponding to the first PRACH resource as a synchronization signal block for access of the terminal device.

In an embodiment, the processing unit 340 is further configured to: determine the first synchronization signal block as a synchronization signal block of a defined cell of the terminal device.

In an embodiment, the processing unit 340 is further configured to: determine a frequency domain reference point based on the synchronization signal block of the defined cell; and perform a resource allocation, partial configuration or scheduling of a bandwidth for the terminal device based on the frequency domain reference point.

It should be understood that network device 300 may correspond to the network device in the method embodiments, and can implement corresponding operations implemented by the network device in the method embodiments, which will not be repeated for the sake of brevity.

Figure 8:
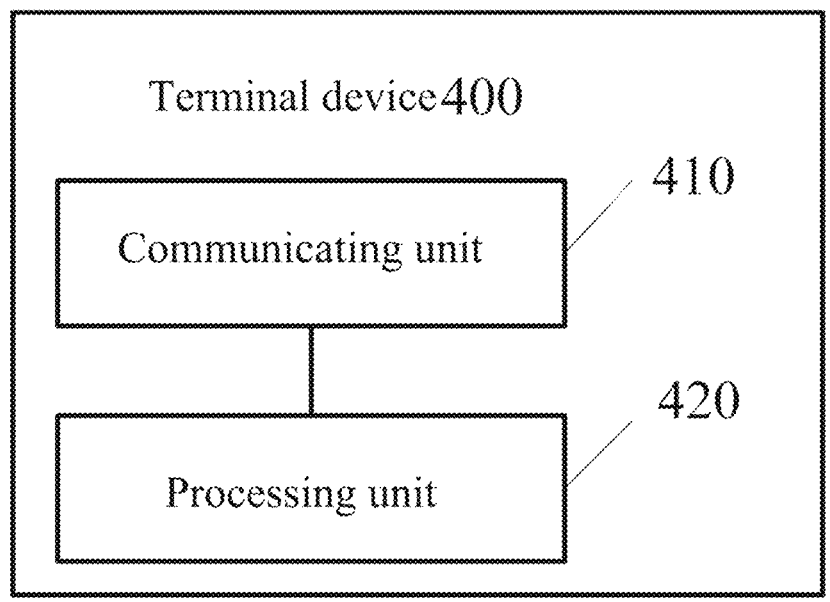
FIG. 8 is a schematic structural diagram of a terminal device according to an embodiment of the present application.

FIG. 8 is a schematic structural diagram of a terminal device 400 according to an embodiment of the present application. As shown in FIG. 8, the terminal device 400 includes a communicating unit 410 and a processing unit 420.

Where the communicating unit 410 is configured to: acquire, according to the indication of the detected first synchronization signal block, the first system information, where the first system information indicates a physical random access channel (PRACH) resource or a set of random access preambles corresponding to the at least one synchronization signal block transmitted on each of at least one frequency point, and the at least one synchronization signal block includes the first synchronization signal block; the processing unit 420 is configured to: determine a first PRACH resource or a first set of random access preambles corresponding to the first synchronization signal block from the first system information; the communicating unit 410 is further configured to: perform random access through the first PRACH resource or the first set of random access preambles.

It should be understood that terminal device 400 may correspond to the terminal device in the method embodiments, and can implement corresponding operations implemented by the terminal device in the method embodiments, which will not be repeated for the sake of brevity.

Figure 9:
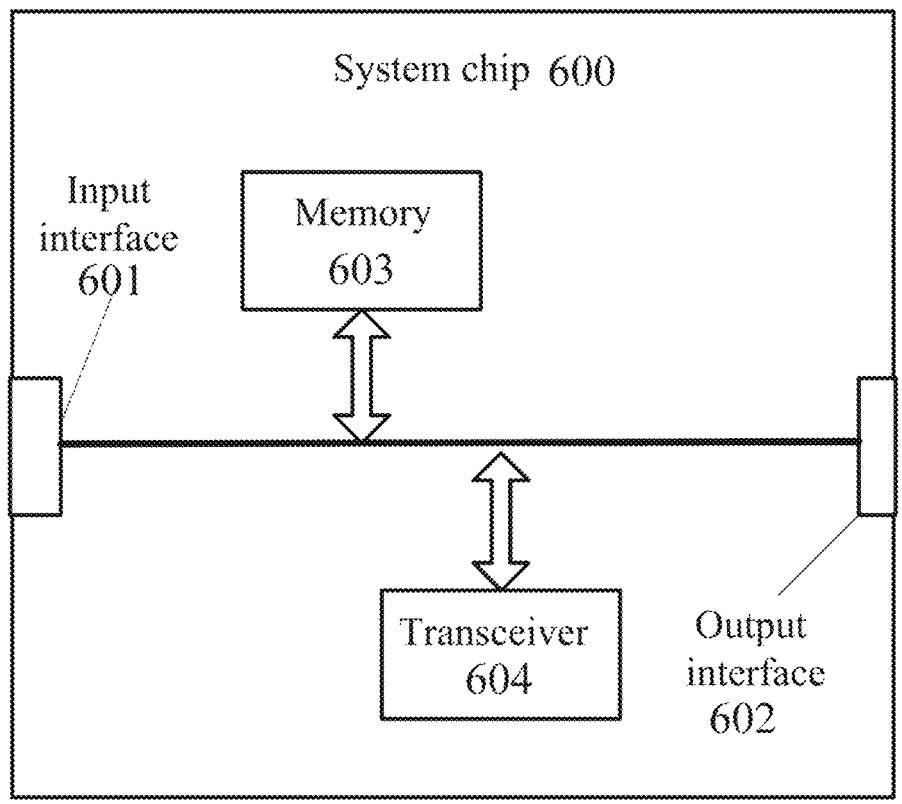
FIG. 9 is a schematic structural diagram of a system chip according to an embodiment of the present application.

FIG. 9 is a schematic structural diagram of a system chip 600 according to an embodiment of the present application. The system chip 600 of FIG. 9 includes an input interface 601, an output interface 602, a processor 603 and a memory 604 that can be connected by internal communication connection lines, and the processor 603 is configured to execute a code in the memory 604.

In an embodiment, when the code is executed, the processor 603 implements the method performed by the network device in the method embodiments, which will not be repeated for the sake of brevity.

In an embodiment, when the code is executed, the processor 603 implements the method performed by the terminal device in the method embodiments, which will not be repeated for the sake of brevity.

Figure 10:
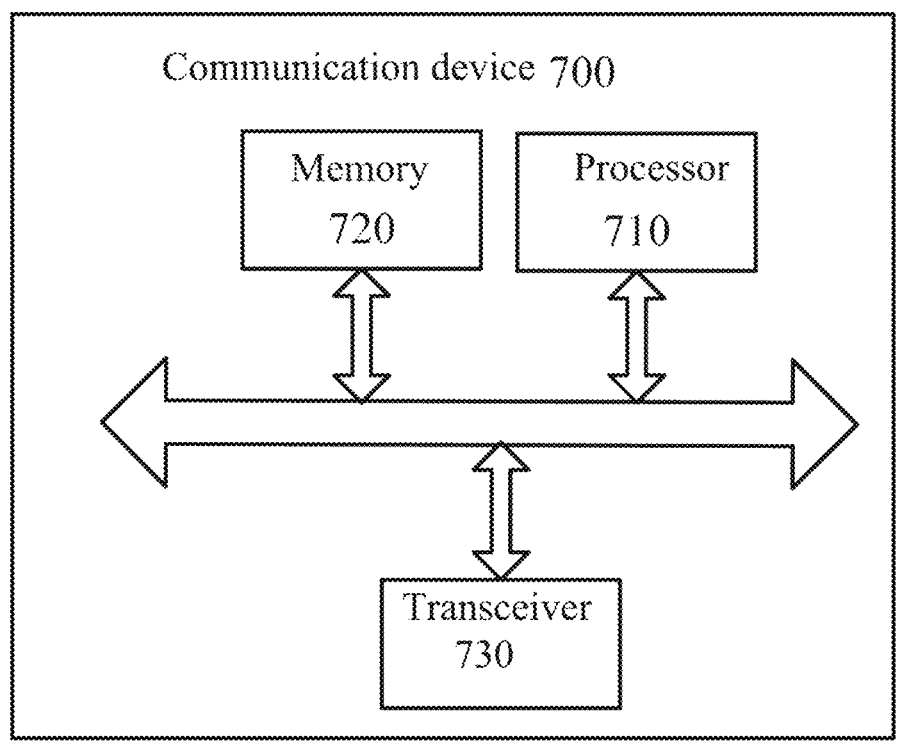
FIG. 10 is a schematic structural diagram of a communication device according to an embodiment of the present application.

FIG. 10 is a schematic structural diagram of a communication device 700 according to an embodiment of the present application. As shown in FIG. 10, the communication device 700 includes a processor 710 and a memory 720. The memory 720 can store a program code, and the processor 710 can execute the program code stored in the memory 720.

In an embodiment, as shown in FIG. 10, the communication device 700 may include a transceiver 730, the processor 710 can control the transceiver 730 to perform external communications.

In an embodiment, the processor 710 can call the program code stored in the memory 720 to perform corresponding operations of the network device in the method embodiments, which will not be repeated for the sake of brevity.

In an embodiment, the processor 710 can call the program code stored in the memory 720 to perform corresponding operations of the terminal device in the method embodiments, which will not be repeated for the sake of brevity.

It should be understood that the processor in the embodiments of the present application may be an integrated circuit chip capable of signal processing. In the implementation process, each step of the above method embodiments may be completed by an integrated logic circuit of hardware in a processor or an instruction in a form of software. The above processor may be a general processor, a digital signal processor (DSP), an application specific integrated circuit (ASIC), a field programmable gate array (FPGA) or other programmable logic devices, a discrete gate or a transistor logic device, a discrete hardware component, etc. Each method, step and logic structural diagram disclosed in the embodiments of the present application can be implemented or performed. The general processor may be a microprocessor, or any conventional processor or the like. Steps of the method disclosed with reference to the embodiments of the present application may be directly embodied as being performed and completed by a hardware decoding processor, or may be performed and completed by a combination of hardware and software modules in the decoding processor. The software module can be located in a mature storage medium in the art such as a random access memory, a flash memory, a read only memory, a programmable read only memory or an electrically erasable programmable memory, a register. The storage medium is located in the memory, and the processor reads information in the memory and completes steps of the above method in combination with its hardware.

It should be understood that the memory in the embodiments of the present application may be a volatile memory or a non-volatile memory, or may include both the volatile memory and the non-volatile memory. Where the non-volatile memory may be a read-only memory (ROM), a programmable read only memory (PROM), an erasable PROM (EPROM), or an electrically EPROM (EEPROM) or a flash memory. The volatile memory may be a random access memory (RAM) that acts as an external cache. By way of example rather than limiting illustration, many forms of RAM are available, such as a static random access memory (SRAM), a dynamic random access memory (DRAM), a synchronous DRAM (SDRAM), a double data rate SDRAM (DDR SDRAM), an enhanced synchronous dynamic random access memory (ESDRAM), a synchlink DRAM, (SLDRAM)) and a direct rambus RAM (DR RAM). It should be noted that memories of the systems and methods described herein are intended to include, but not limited to, these and any other suitable types of memory.

Those of ordinary skill in the art will appreciate that units and algorithm steps of each example described with reference to the embodiment disclosed herein can be implemented in electronic hardware or a combination of computer software and electronic hardware. Whether these functions are executed in hardware or software depends on the specific application and design constraints of the solution. For each specific application, a person skilled in the art can use different methods for implementing the described functions, but such implementation should not be considered to be beyond the scope of the present application.

A person skilled in the art can clearly understand that for convenience and brevity of the description, the specific working process of the system, device and unit described above may refer to corresponding processes in the above method embodiments, and will not be repeated herein.

In the several embodiments provided by the present application, it should be understood that the disclosed systems, devices, and methods may be implemented in other ways. For example, the device embodiments described above are merely illustrative. For example, the division of the unit is only a logical function division, and there may be other division ways in actual implementations, for example, multiple units or components may be combined or integrated into another system, or some features may be ignored or not executed. In addition, the coupling or direct coupling or communication connection shown or discussed herein may be an indirect coupling or communication connection of devices or units through some interfaces, and may be electrical, mechanical or in other forms.

The units described as separate components may be or may not be physically separated, and the components displayed as units may be or may not be physical units, that is, they may be located in one place, or may be distributed onto multiple network units. Some or all of the units may be selected according to actual needs for the purpose of the solution of the present embodiment.

In addition, each functional unit in each embodiment of the present application may be integrated into one processing unit, or each unit may physically exist, separately, or two or more units may be integrated into one unit.

The functions may be stored in a computer readable storage medium if implemented in the form of a software functional unit, and sold or used as a standalone product. Based on such understanding, the technical solution of the present application, in essence, or the part contributing to the existing technology or a part of the technical solution can be embodied in the form of a software product, which is stored in a storage medium and includes instructions for enabling a computer device (which may be a personal computer, a server, or a network device, etc.) to perform all or part of the steps described in the methods in each embodiment of the present application. The above storage medium includes various media that can store a program code, such as a U disk, a mobile hard disk, a read-only memory (ROM), a random access memory (RAM), a magnetic disk, or an optical disk.

The above is only a specific implementation manner of the present application, the protection scope of the present application is not limited thereto, and changes or substitutions that can easily be thought of by those skilled in the art within the technical scope disclosed in the present application should be covered by the protection scope of the present application. Therefore, the protection scope of the present application should be subject to the protection scope of the claims.

What is claimed is:

1. A wireless communication method, comprising:
acquiring, by a terminal device, first system information according to an indication of a detected first synchronization signal block, wherein the first system information indicates a physical random access channel (PRACH) resource or a set of random access preambles corresponding to at least one synchronization signal block transmitted on each of at least one frequency point, the at least one synchronization signal block comprises the first synchronization signal block, and the first system information comprises an association relationship corresponding to each frequency point, and the association relationship refers to an association relationship between at least one synchronization signal block transmitted on a corresponding frequency point and a PRACH resource or a set of random access preambles;
determining, by the terminal device, from the first system information, the association relationship corresponding to the frequency point occupied by the first synchronization signal block;
determining, by the terminal device, according to the association relationship corresponding to the frequency point occupied by the first synchronization signal block, a first PRACH resource or a first set of random access preambles corresponding to the first synchronization signal block; and performing, by the terminal device, random access through the first PRACH resource or the first set of random access preambles;

wherein the first system information further comprises: first frequency point information of a frequency point corresponding to each association relationship;

wherein the determining, by the terminal device, from the first system information, the association relationship corresponding to the frequency point occupied by the first synchronization signal block comprises:

determining, by the terminal device, according to second frequency point information of the frequency point occupied by the first synchronization signal block and first frequency point information of the at least one frequency point, from the first system information, the association relationship corresponding to the frequency point occupied by the first synchronization signal block;

wherein the first frequency point information indicates a first frequency domain offset between a frequency point corresponding to the association relationship and a frequency point occupied by the first system information; the second frequency point information is comprised in second system information comprised in the first synchronization signal block, and the second frequency point information indicates a second frequency domain offset between the frequency point occupied by the first synchronization signal block and the frequency point occupied by the first system information;

wherein the determining, by the terminal device, the association relationship corresponding to the frequency point occupied by the first synchronization signal block comprises:

determining, by the terminal device, according to the second frequency domain offset and the first frequency domain offset of the at least one frequency point, from the first system information, the association relationship corresponding to the frequency point occupied by the first synchronization signal block;

wherein the first frequency point information comprises a number value corresponding to a frequency value of the first frequency domain offset, and the second frequency point information comprises a number value corresponding to a frequency value of the second frequency domain offset;

wherein the determining, by the terminal device, the association relationship corresponding to the frequency point occupied by the first synchronization signal block comprises:

determining, by the terminal device, according to a number value comprised in the second system information and at least one number value comprised in the first system information, the association relationship corresponding to the frequency point occupied by the first synchronization signal block.

2. The method according to claim 1, wherein the first system information further comprises a plurality of indication bits having a one-to-one correspondence to a plurality of frequency points, the plurality of frequency points comprises the at least one frequency point, and the indication bit indicates whether the first system information comprises the association relationship corresponding to a frequency point corresponding to the indication bit; information of the association relationship of the at least one frequency point is comprised in the first system information according to an arrangement order of the plurality of indication bits between the at least one frequency point;

wherein the determining, by the terminal device, from the first system information, the association relationship corresponding to the frequency point occupied by the first synchronization signal block comprises:

determining, by the terminal device, according to a position of the frequency point occupied by the first synchronization signal block in the plurality of indication bits, a position of the association relationship corresponding to the frequency point occupied by the first synchronization signal block in the first system information; and determining, by the terminal device, on the determined position and from the first system information, the association relationship corresponding to the frequency point occupied by the first synchronization signal block.

3. The method according to claim 1, wherein the determining, by the terminal device, the association relationship corresponding to the frequency point occupied by the first synchronization signal block comprises:

determining, in the at least one number value, an association relationship corresponding to a number value equal to the number value comprised in the second system information, as the association relationship corresponding to the frequency point occupied by the first synchronization signal block.

4. The method according to claim 1, wherein the determining, by the terminal device, the association relationship corresponding to the frequency point occupied by the first synchronization signal block comprises:

determining, according to a corresponding relationship between a plurality of first number values and a plurality of second number values, a first number value corresponding to the number value comprised in the second system information, wherein the first number value is a number value that can be carried in the first system information, and the second number value is a number value that can be carried in the second system information;

wherein the determining, by the terminal device, the association relationship corresponding to the frequency point occupied by the first synchronization signal block comprises:

determining, in the at least one number value, an association relationship corresponding to a number value equal to the determined first number value, as the association relationship corresponding to the frequency point occupied by the first synchronization signal block.

5. The method according to claim 1, wherein the determining, by the terminal device, the association relationship corresponding to the frequency point occupied by the first synchronization signal block comprises:

determining, according to a second association relationship between a plurality of second number values and a plurality of frequency values of frequency domain offsets of second relative frequency position relationships, a frequency value of a frequency domain offset of a second relative frequency position relationship corresponding to the number value comprised in the second system information, wherein the second number value is a number value that can be carried in the second system information;

determining, according to the determined frequency value of the frequency domain offset of the second relative frequency position relationship, a frequency value of a frequency domain offset of a first relative frequency position relationship;

determining, according to a first association relationship between a plurality of first number values and a plurality of frequency values of frequency domain offsets of first relative frequency position relationships, and according to the determined frequency value of the frequency domain offset of the first relative frequency position relationship, a first number value corresponding to a number value comprised in the first system information, wherein the first number value is a number value that can be carried in the first system information; and determining, in the at least one number value, an association relationship corresponding to a number value equal to the determined first number value, as the association relationship corresponding to the frequency point occupied by the first synchronization signal block.

6. The method according to claim 1, wherein the first frequency point information is a value of an absolute frequency point comprised in the first system information; the second system information comprises a value of an absolute frequency point occupied by the first synchronization signal block;

wherein the determining, by the terminal device, from the first system information, the association relationship corresponding to the frequency point occupied by the first synchronization signal block comprises:

determining, in a value of an absolute frequency point of the at least one frequency point, an association relationship corresponding to a value of an absolute frequency point equal to the value of the absolute frequency point occupied by the first synchronization signal block, as the association relationship corresponding to the frequency point occupied by the first synchronization signal block.

7. A terminal device, comprising a processor and a memory having executable instructions stored thereon that when executed by the processor cause the processor to:

acquire first system information according to an indication of a detected first synchronization signal block, wherein the first system information indicates a physical random access channel (PRACH) resource or a set of random access preambles corresponding to at least one synchronization signal block transmitted on each of at least one frequency point, and the at least one synchronization signal block comprises the first synchronization signal block, and the first system information comprises an association relationship corresponding to each frequency point, and the association relationship refers to an association relationship between at least one synchronization signal block transmitted on a corresponding frequency point and a PRACH resource or a set of random access preambles;

determine, from the first system information, the association relationship corresponding to the frequency point occupied by the first synchronization signal block;

determine, according to the association relationship corresponding to the frequency point occupied by the first synchronization signal block, a first PRACH resource or a first set of random access preambles corresponding to the first synchronization signal block; and perform random access through the first PRACH resource or the first set of random access preambles;

wherein the first system information further comprises: first frequency point information of a frequency point corresponding to each association relationship;

the processor is further configured to:

determine, according to second frequency point information of the frequency point occupied by the first synchronization signal block and first frequency point information of the at least one frequency point, from the first system information, the association relationship corresponding to the frequency point occupied by the first synchronization signal block;

wherein the first frequency point information indicates a first frequency domain offset between a frequency point corresponding to the association relationship and a frequency point occupied by the first system information; the second frequency point information is comprised in second system information comprised in the first synchronization signal block, and the second frequency point information indicates a second frequency domain offset between the frequency point occupied by the first synchronization signal block and the frequency point occupied by the first system information;

the processor is further configured to:

determine, according to the second frequency domain offset and the first frequency domain offset of the at least one frequency point, from the first system information, the association relationship corresponding to the frequency point occupied by the first synchronization signal block;

wherein the first frequency point information comprises a number value corresponding to a frequency value of the first frequency domain offset, and the second frequency point information comprises a number value corresponding to a frequency value of the second frequency domain offset;

the processor is further configured to:

determine, according to a number value comprised in the second system information and at least one number value comprised in the first system information, the association relationship corresponding to the frequency point occupied by the first synchronization signal block.

8. The device according to claim 7, wherein the first system information further comprises a plurality of indication bits having a one-to-one correspondence to a plurality of frequency points, the plurality of frequency points comprises the at least one frequency point, and the indication bit indicates whether the first system information comprises the association relationship corresponding to a frequency point corresponding to the indication bit; information of the association relationship of the at least one frequency point is comprised in the first system information according to an arrangement order of the plurality of indication bits between the at least one frequency point;

the processor is further configured to:

determine, according to a position of the frequency point occupied by the first synchronization signal block in the plurality of indication bits, a position of the association relationship corresponding to the frequency point occupied by the first synchronization signal block in the first system information; and determine, on the determined position and from the first system information, the association relationship corresponding to the frequency point occupied by the first synchronization signal block.

9. The device according to claim 7, wherein the processor is further configured to:

determine, in the at least one number value, an association relationship corresponding to a number value equal to the number value comprised in the second system information, as the association relationship corresponding to the frequency point occupied by the first synchronization signal block.

10. The device according to claim 7, wherein the processor is further configured to:
  determine, according to a corresponding relationship between a plurality of first number values and a plurality of second number values, a first number value corresponding to the number value comprised in the second system information, wherein the first number value is a number value that can be carried in the first system information, and the second number value is a number value that can be carried in the second system information; and
  determine, in the at least one number value, an association relationship corresponding to a number value equal to the determined first number value, as the association relationship corresponding to the frequency point occupied by the first synchronization signal block.

11. The device according to claim 7, wherein the processor is further configured to:
  determine, according to a second association relationship between a plurality of second number values and a plurality of frequency values of frequency domain offsets of second relative frequency position relationships, a frequency value of a frequency domain offset of a second relative frequency position relationship corresponding to the number value comprised in the second system information, wherein the second number value is a number value that can be carried in the second system information;
  determine, according to the determined frequency value of the frequency domain offset of the second relative frequency position relationship, a frequency value of a frequency domain offset of a first relative frequency position relationship;
  determine, according to a first association relationship between a plurality of first number values and a plurality of frequency values of frequency domain offsets of first relative frequency position relationships, and according to the determined frequency value of the frequency domain offset of the first relative frequency position relationship, a first number value corresponding to a number value comprised in the first system information, wherein the first number value is a number value that can be carried in the first system information; and
  determine, in the at least one number value, an association relationship corresponding to a number value equal to the determined first number value, as the association relationship corresponding to the frequency point occupied by the first synchronization signal block.

12. The device according to claim 7, wherein the first frequency point information is a value of an absolute frequency point comprised in the first system information; the second system information comprises a value of an absolute frequency point occupied by the first synchronization signal block;
  the processor is further configured to:
  determine, in a value of an absolute frequency point of the at least one frequency point, an association relationship corresponding to a value of an absolute frequency point equal to the value of the absolute frequency point occupied by the first synchronization signal block, as the association relationship corresponding to the frequency point occupied by the first synchronization signal block.

* * * * *